(12) United States Patent
Robinson et al.

(10) Patent No.: US 9,134,541 B2
(45) Date of Patent: Sep. 15, 2015

(54) STEREOSCOPIC DISPLAY SYSTEM WITH ACTIVE SWITCHABLE RETARDER

(71) Applicant: RealD Inc., Beverly Hills, CA (US)

(72) Inventors: Michael G. Robinson, Boulder, CO (US); Douglas K. McKnight, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 345 days.

(21) Appl. No.: 13/646,253

(22) Filed: Oct. 5, 2012

(65) Prior Publication Data

US 2013/0088655 A1    Apr. 11, 2013

Related U.S. Application Data

(60) Provisional application No. 61/543,773, filed on Oct. 5, 2011.

(51) Int. Cl.
*G02B 27/26* (2006.01)
*G02B 27/22* (2006.01)

(52) U.S. Cl.
CPC ............... *G02B 27/26* (2013.01); *G02B 27/22* (2013.01); *G02B 27/2264* (2013.01)

(58) Field of Classification Search
CPC .............................. G02B 27/22; G02B 27/26
USPC ........................................................ 349/15
See application file for complete search history.

(56) References Cited

U.S. PATENT DOCUMENTS

| 2008/0316303 | A1 | 12/2008 | Chiu |
| 2011/0298998 | A1 | 12/2011 | Robinson |
| 2011/0298999 | A1* | 12/2011 | Robinson et al. ............... 349/15 |
| 2012/0147280 | A1* | 6/2012 | Osterman et al. ................. 349/9 |
| 2014/0320470 | A1* | 10/2014 | Jung ............................. 345/209 |

OTHER PUBLICATIONS

Jung, et al. "A Novel Polarizer Glasses-type 3D Displays with an Active Retarder," p. 348—SID 09 Digest.

* cited by examiner

*Primary Examiner* — Thanh-Nhan P Nguyen
(74) *Attorney, Agent, or Firm* — Darlene K. Kondo; Neil G. Mothew

(57) ABSTRACT

Disclosed herein are displays and related methods for providing stereoscopic imagery, wherein an air gap may be provided between components of the display to allow a reduction in the amount of bonding material used to bond a stereoscopic display panel with a polarization control panel (PCP) element comprising an active switchable retarder. In some embodiments, the PCP element is at least the size of the display panel such that the entirety of the display panel is covered by the PCP element, and thus there would be neither tight tolerance horizontal nor vertical alignment requirements between the PCP element and the display panel. Structural support of the components of the display may be provided by bonding around the edges of the rigid or semi-rigid stereoscopic display panel and PCP element. For example, the air gap may be created with uniform spacers between the stereoscopic display panel and the PCP element.

28 Claims, 3 Drawing Sheets

STEREOSCOPIC DISPLAY SYSTEM WITH ACTIVE SWITCHABLE RETARDER

PRIORITY CLAIM

This disclosure is a nonprovisional conversion of, and thus claims priority to, U.S. Provisional Patent Application No. 61/543,773, entitled "Stereoscopic display system with liquid-crystal switchable retarder" and filed on Oct. 5, 2011.

TECHNICAL FIELD

This disclosure generally relates to stereoscopic liquid crystal display (LCD) systems and, more particularly, relates to system assemblies that are compatible with suitable eyewear.

BACKGROUND

Stereoscopic, or stereo, 3D displays enhance the perception of images presented on a 2D screen by presenting different images to each eye of the viewer. The viewer's visual system fuses these disparate images in such a way as to create a sensation of depth. To create 3D effects, conventional approaches have used eyewear to determine which image data goes to the left or right eye. Conventional approaches may be applied to both cinema and direct-view display systems.

SUMMARY

In accordance with the disclosed principles of displays and related methods for providing stereoscopic imagery, an air gap may be provided between components of the display to allow a reduction in the amount of bonding material used to bond the LCD panel with a polarization control panel (PCP) element comprising a liquid crystal (LC) switchable retarder. Another benefit of including an air gap is the simplification of the process of assembling the display and an improvement in process yield. Structural support of the components of the display may be provided by bonding around the edges of the rigid or semi-rigid LCD panel and PCP element. The air gap may be created with uniform spacers between the LCD panel and the PCP element.

In one specific exemplary embodiment, a display for providing stereoscopic imagery in accordance with the disclosed principles may comprise a stereoscopic display panel operable to provide left-eye and right-eye image encoded light; and a PCP element positioned to receive light from the stereoscopic display panel. The PCP element may comprise an active switchable retarder operable to selectively transform the state of polarization of light received from the stereoscopic display panel in synchronization with the left-eye and right-eye image encoded light. In addition, the stereoscopic display panel may be bonded to the PCP element with an air gap therebetween, wherein the air gap is substantially coextensive along both length and width of the stereoscopic display panel.

In another exemplary embodiment, a display in accordance with the disclosed principles may comprise a stereoscopic display panel operable to provide left-eye and right-eye image encoded light, and a PCP element positioned to receive light from the stereoscopic display panel where the PCP element is larger in length and width than the stereoscopic display panel such that the entirety of the stereoscopic display panel is covered by the PCP element. In addition, the PCP element may comprise an active switchable retarder operable to selectively transform the state of polarization of light received from the stereoscopic display panel in synchronization with the left-eye and right-eye image encoded light. Moreover, such an exemplary display may further comprise substantially uniform spacers positioned along the perimeter of the stereoscopic display panel, wherein the stereoscopic display panel is bonded to the PCP element using said substantially uniform spacers to provide an air gap therebetween. As before, the air gap may be substantially coextensive along both length and width of the stereoscopic display panel.

In yet another exemplary embodiment, a display in accordance with the disclosed principles may comprise a liquid crystal display panel operable to provide left-eye and right-eye image encoded light, and a PCP element positioned to receive light from the LC panel, wherein again the PCP element is larger in length and width than the LC display panel such that the entirety of the LC display panel is covered by the PCP element. In such embodiments, the PCP element may comprise an active LC switchable retarder operable to selectively transform the state of polarization of light received from the LC panel in synchronization with the left-eye and right-eye image encoded light. As with other embodiments, the LC panel may be bonded to the PCP element with an air gap therebetween, where the air gap is again substantially coextensive along both length and width of the LC panel.

In yet another exemplary embodiment, a display in accordance with the disclosed principles may comprise an organic light-emitting diode (OLED) display panel operable to provide left-eye and right-eye image encoded light, and a PCP element positioned to receive light from the OLED panel, wherein again the PCP element is larger in length and width than the OLED display panel such that the entirety of the OLED display panel is covered by the PCP element. In such embodiments, the PCP element may comprise an active LC switchable retarder operable to selectively transform the state of polarization of light received from the OLED panel in synchronization with the left-eye and right-eye image encoded light. As with other embodiments, the OLED panel may be bonded to the PCP element with an air gap therebetween, where the air gap is again substantially coextensive along both length and width of the OLED panel.

DETAILED DESCRIPTION

Figure 1:
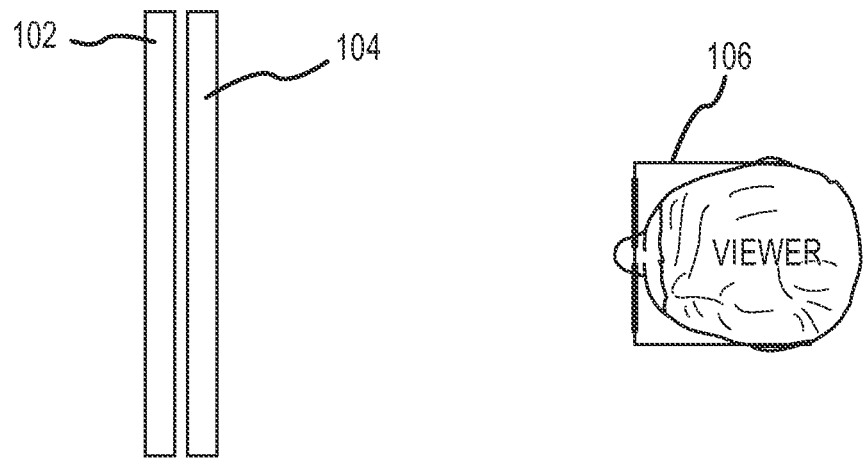
FIG. 1 is a schematic diagram of the top view of a conventional LCD display system.

FIG. 1 is a schematic diagram illustrating a conventional stereoscopic liquid crystal display system 100 comprising a liquid crystal display (LCD) 102 located proximate to a polarization control panel (PCP) 104. The LCD 102 may alternately display left- and right-eye images that are selectively polarized with the liquid crystal PCP 104. Passive polarizing eyewear 106 worn by a viewer then blocks light emitted from the display from reaching the incorrect eye of the viewer.

This approach is similar in concept to a 3D cinema system, but the projector in a 3D cinema system is replaced by an LCD. However, LCDs are typically slow to update and are addressed line by line in a continuous scroll. It is thus difficult to view or polarize correctly an entire settled frame in isolation without modifying certain aspects of this conventional approach. For example, U.S. Patent Publication No. 2008/0316303, which is herein incorporated by reference, is directed to providing a scrolling segmented polarization control panel with optional alternate panel addressing and temporal and spatial control of the back light illumination.

One aspect of the present disclosure is directed to display systems that may be compatible with circularly polarized, passive cinema eyewear whose lenses may each comprise a single, orthogonally oriented with respect to the other eye, quarter wave retarder film coupled to a neutral horizontal polarizer. This prescription may be used to analyze particular stereoscopic polarization states from a compatible display for optimal performance. Such stereoscopic polarization states may be encoded, in an exemplary embodiment, by first launching linear, vertically polarized light into modulating retardation elements oriented orthogonally, such as at ±45° to make polarization states intended for each eye. In practice an electrically switchable liquid crystal retarder element may be used to switch sequentially between polarization states intended for the left and right eyes. This may be accomplished by combining a retarder switching between a retardance of approximately zero and a half wave oriented at, e.g., +45 degrees, with a fixed retarder of approximately a quarter wave oriented at −45 degrees. When the electrically controlled retarder is switched to a half-wave, the effect of this assembly is approximately equivalent to a quarter wave retarder oriented at +45 degrees, and when the electrically controlled retarder is switched to approximately zero retardance, the effect of this assembly is approximately equivalent to a quarter wave retarder oriented at −45 degrees. This may be distinguishable from using twisted nematic liquid crystal modulators, such as the approach used in *A Novel Polarizer Glasses-Type 3D Displays with an Active Retarder*, p. 348•SID 09 DIGEST, as part of the polarization control panel element. Twisted liquid crystal modulators provide complex output polarization states that are only approximately analyzed by untwisted components. For viewing angle purposes, twisted nematic LC display panels have output linear polarization oriented at ±45° to the vertical. Altering this orientation to a vertical orientation, before the PCP, to match the requirements of the eyewear may be achieved using one or more retarder films. In some embodiments, such an approach provides insufficient polarization fidelity. Thus, a vertical, highly transmitting, 'clean-up' polarizer may be used prior to the polarization control panel.

Figure 2A:
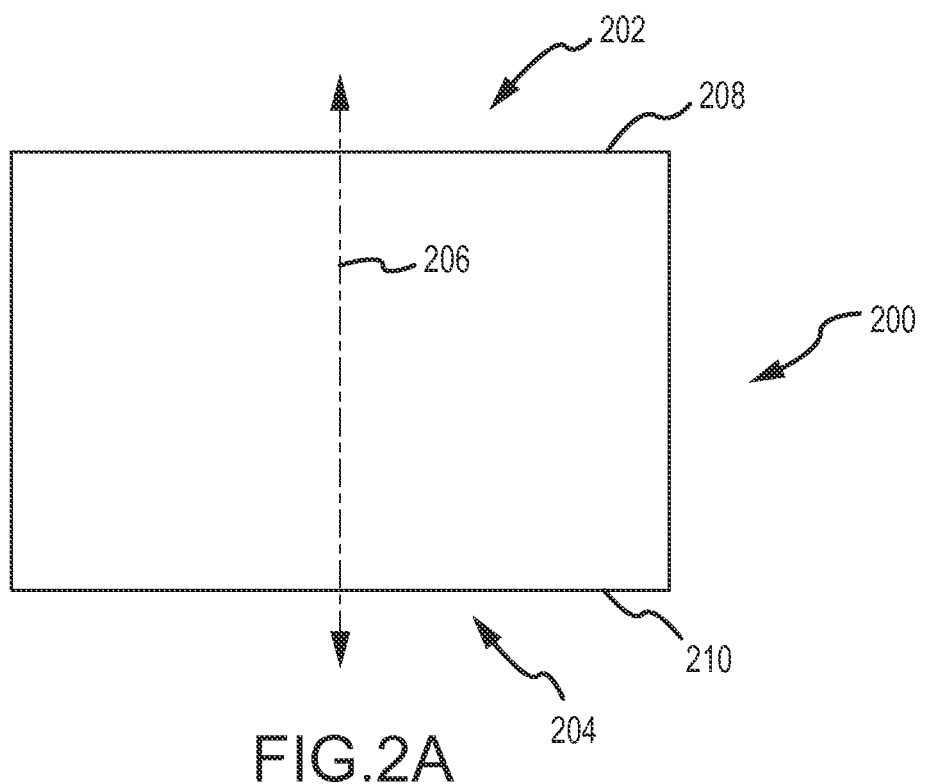
FIG. 2A is a schematic diagram of the frontal view of a general cinema-eyewear-compatible, time-sequential stereoscopic LCD system, in accordance with the present disclosure.

As discussed above, one aspect of the principles provided in the present disclosure is directed to rotating the polarization axis of the light provided by an LCD panel to match the cinema eyewear. FIG. 2A illustrates a frontal view of an exemplary display 200 constructed in accordance with the disclosed principles. The display 200 is operable to display stereoscopic imagery, and a top 202 and a bottom 204 of the display 200 are defined by a viewer frame of reference. A vertical orientation is defined by a line 206 extending from the top 202 to the bottom 204 of the display 200, and is perpendicular to a top edge 208 and a bottom edge 210 of the display 200. Orientation angles are defined from the vertical 206 when looking toward the display 200. As used herein, clockwise rotation is a positive angle, and counterclockwise rotation is described as a negative angle from the vertical 206.

Figure 2B:
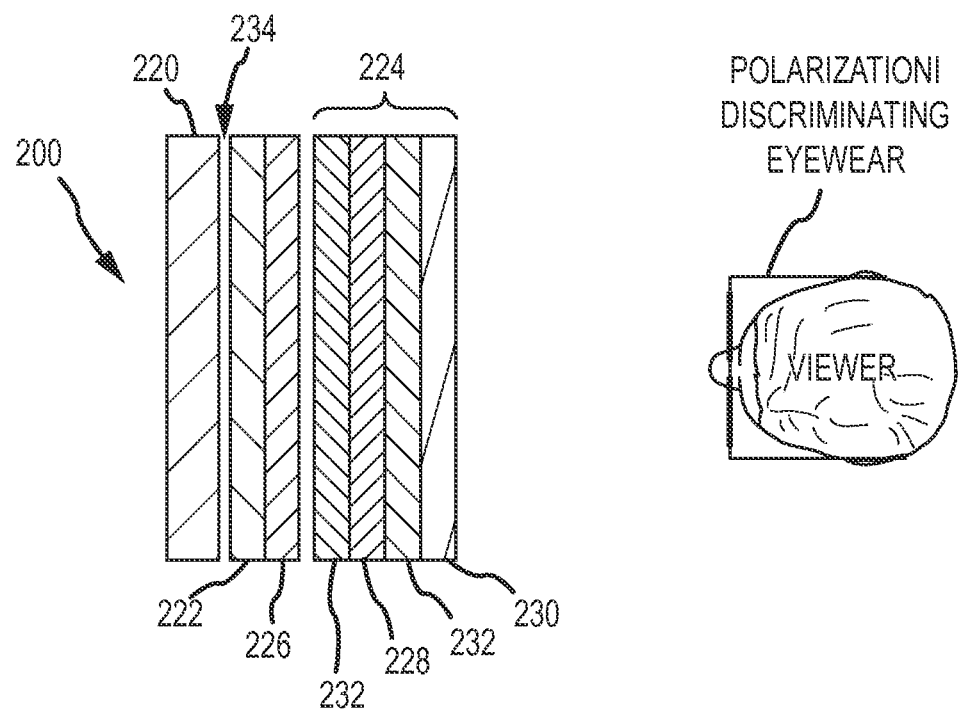
FIG. 2B is a schematic diagram of the exploded side view of the LCD system shown in FIG. 2A.

FIG. 2B is an exploded side view of the display 200 shown in FIG. 2A. The display 200 may be incorporated in a number of devices that include a display, such as a television, a desktop computer, a laptop computer, a tablet computer, handheld gaming device, etc. As shown in FIG. 2B, the display 200 may include a liquid crystal display (LCD) panel 220 operable to provide left-eye and right-eye image encoded light. It is appreciated that while the display 200 is described with respect to an LCD panel, other types of display devices may be used, such as plasma, DLP, OLED, or any other display devices known in the art. In an exemplary embodiment, the LCD panel 220 may be a twisted nematic liquid crystal display (TNLCD) panel that is operable to provide light having a polarization axis that is not parallel to the vertical. In another exemplary embodiment, other LC panels known in the art, or even later developed, may be employed with the principles disclosed herein. The elements of the display 200 may reflect the similarly-numbered elements of related U.S. patent application Ser. No. 13/156,318 entitled "Stereoscopic liquid crystal display systems" and U.S. patent application Ser. No. 13/156,321 entitled "Stereoscopic liquid crystal display system," both of which were filed on Jun. 8, 2011, and claim priority to U.S. Provisional Patent Application No. 61/352,773, which was filed on Jun. 8, 2010, each of which are commonly-owned and herein incorporated by reference in their entireties.

The LCD panel 220 may be a rigid or semi-rigid panel and may further comprise a liquid crystal (LC) cell (not shown) and a polarization film (not shown) disposed on a first surface of the LC cell. The first surface of the LC cell may be a flat surface of the LC cell and proximate to the viewer.

The display 200 may further include an optional polarization rotation element 222 positioned to receive the left-eye and right-eye image encoded light incident from the LCD panel 220, and operable to rotate the polarization axis of the incident light to a substantially vertical orientation. The display 200 may further include an optional clean-up polarizer 226 positioned proximate to the polarization rotation element 222 that may be used to filter out unwanted light having a polarization axis that is not parallel to the vertical and transmit light only along the vertical orientation. Both the polarization rotation element 222 and the clean-up polarizer 226 may be used if the output from the polarization film of the LCD panel 220 is not substantially vertical (0°). If the output is not vertical, the polarization rotation element 222 and the clean-up polarizer 226 or just the polarization rotation element 222, may be used to rotate the polarization axis of the incident light to a substantially vertical orientation.

The display 200 may also include a polarization control panel (PCP) element 224 positioned to receive the light incident from the polarization film disposed on the LC cell of the LCD panel 220, and/or the optional polarization rotation element 222, and operable to selectively transform the state of polarization (SOP) of the received light in synchronization with the left-eye and right-eye image encoded light provided by the LCD panel 220.

The PCP element 224 may be a rigid or semi-rigid element and may comprise an LC switchable retarder 228 oriented at a first angle, a retardation element 230 orientated at a second angle, and one or more optional retarder films 232. The component order of the elements 228, 230, 232 comprising the PCP element 224 may be chosen depending on a viewer's passive eyewear choice, as the ordering and/or orientation of the different components may be changed to work with a particular choice of passive eyewear. The LC switchable retarder 228 may be a pi-cell (parallel aligned) retarder, a fast electronically controlled birefringence (ECB) retarder (anti-parallel aligned), or some other active retarder operable to selectively transform the state of polarization of the received light. In an exemplary embodiment, the PCP element 224 may comprise the retardation element 230 sandwiched between two layers of glass and/or plastic substrates.

Both the LCD panel 220 and the PCP element 224 may be rigid or semi-rigid, and various methods may be used to bond the two rigid or semi-rigid elements together. In one approach, a thermal-set silicone may be used to bond the LCD panel 220 with the PCP element 224. In some embodiments, it may be desired that the two panels 220, 224 may be bonded in such a way as to result in a low-cost, high-yield bonding.

An embodiment of the display 200 in accordance with the present disclosure may be advantageously configured such that the LCD panel 220 and the PCP element 224 are spaced apart from each other. For example, the display 200 may include an air gap 234 between one or more of the components of the display 200 without negatively affecting the performance of the display 200.

However, some tight tolerance 3D systems may not allow an air gap to be included because the alignment requirements of such systems are too stringent. For example, a tight tolerance 3D system may create 3D imagery by using retarders configured in the shape of horizontal stripes, wherein each horizontal stripe is the width of an underlying row of pixels of an LCD behind the retarder. The horizontal stripes may alternate in the direction of the optic axis of a quarter wave retarder, wherein each horizontal stripe will have either a +45° or a −45° orientation, and the orientation of each horizontal stripe alternates from the previous, adjacent horizontal stripe. In such a system, light provided by each horizontal stripe with a +45° orientation may be configured to pass through a first lens of a viewer's eyewear to the viewer's eye and may be configured to be blocked by a second lens, while each horizontal stripe with a −45° orientation may be configured to pass through the second lens of the viewer's eyewear to the viewer's eye and may be configured to be blocked by the first lens. As such, when the viewer looks at a display of the prior art 3D system, each eye will only see half the horizontal stripes and will only see half of the resolution of the display.

In order to make 3D imagery visible on such a 3D system, each horizontal stripe on a retarder must be aligned with the underlying row of pixels of the LCD behind the retarder without much tolerance for error. As such, alignment between the retarder and the LCD must be within approximately 1/10 of a pixel, or approximately 50 microns. If such a tight tolerance 3D system includes an air gap between the LCD and the retarder, even normal use may disrupt the alignment between the retarder and the LCD, rendering the 3D system inoperable for its intended purpose. For example, if a 3D LCD television is mounted to the wall, slight over-torquing of the wall mount to either the television or the wall may disrupt the alignment between the retarder and the LCD by more than 1/10 of a pixel. Additionally, the alignment may be disrupted by changes in temperature and/or humidity, while the 3D LCD television is being moved, if a child or pet bumps into the 3D LCD television, among other things.

On the other hand, the LC switchable retarder 228 of the PCP element 224 in the display 200 has greater tolerance for misalignment. Because the polarization control panel (PCP) element 224 is configured to selectively transform the state of polarization (SOP) for the entire display 200 of the received light in synchronization between the left-eye and right-eye images encoded light provided by the LCD panel 220, the current display 200 does not require nearly the level of alignment precision as the tight tolerance 3D system discussed above. In an advantageous embodiment, the PCP element 224 is at least the size of the LCD panel 220 such that the entirety of the LCD panel 220 may be covered by the PCP element 224, and thus the entire display 200 may project 3D imagery to a viewer and there would be neither strict horizontal nor vertical alignment requirements between the PCP element 224 and the LCD panel 220. For example, if the PCP element 224 is 5 mm larger in height and width than the LCD panel 220, the PCP element 224 would only need to be aligned within 10 mm in both the vertical and the horizontal orientations with the LCD panel 220 because the PCP element 224 could be aligned 5 mm to the left or 5 mm to the right of the LCD panel 220, and 5 mm above or 5 mm below the LCD panel 220, and still cover the entire LCD panel 220.

The differences in the alignment tolerance between the retarder and the LCD in the tight tolerance 3D system discussed above and the alignment tolerance between the PCP element 224 and the LCD panel 220 of the presently disclosed display 200 may be an alignment factor of 500 or more. Accordingly, the difficulty of utilizing an air gap in the tight tolerance 3D system is not applicable with the display 200. As such, one or more of the components of the display 200 may be separated by an air gap and bonded around the edges of the components. As such, the display 200 may take advantage of incorporating an air gap 234 to simplify the assembly process and increase yield.

Referring back to FIG. 2B, the air gap 234 may be placed between one or more of the components of the display 200, although in an exemplary embodiment, the air gap 234 may be placed proximate to the LCD panel 220, as illustrated in FIG. 2B. In the illustrated exemplary embodiment, the retarder films 232 may be disposed on each side of the LC switchable retarder 228, which together with the retardation element 230, may comprise the PCP element 224. Alternatively, the air gap 234 may be spaced between any two component layers 220, 222, 226, 232, 228, 232, and 230 when viewed from above and left to right, as shown in FIG. 2B.

Figure 2C:
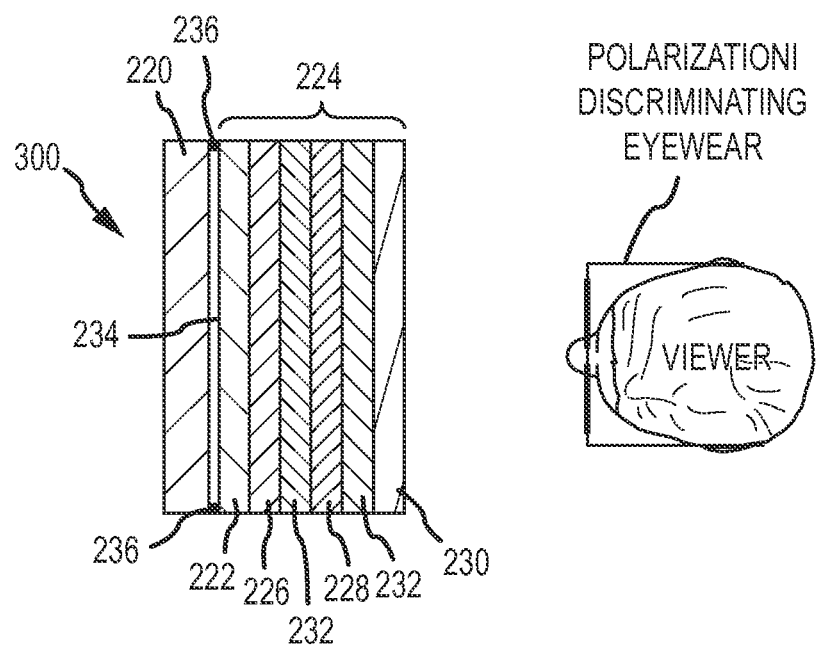
FIGS. 2C and 2D are schematic diagrams of the exploded side view of an alternative embodiment of the LCD system shown in FIG. 2A.
Figure 2D:
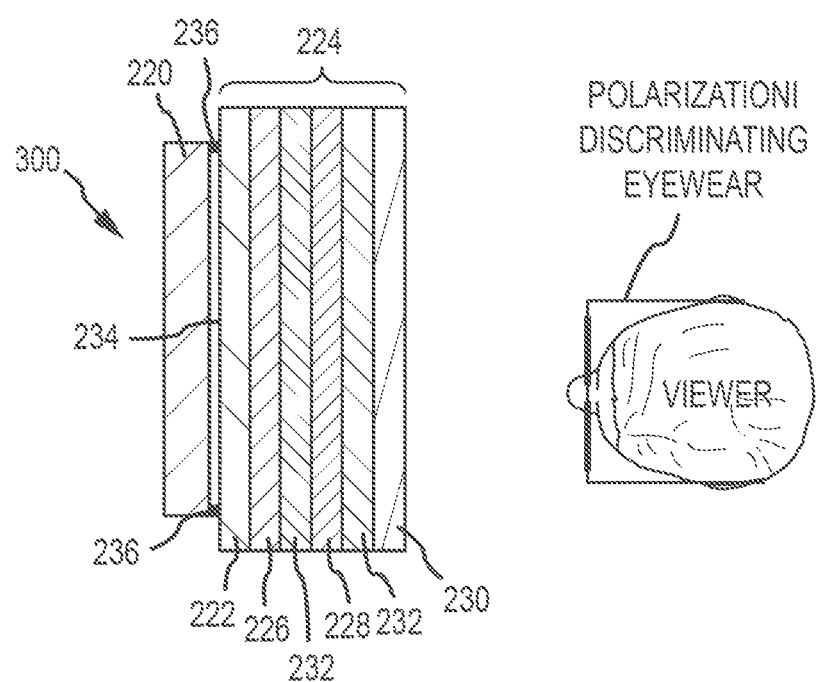

FIGS. 2C and 2D illustrate an alternative embodiment of a display 300 employing the same components as the display of FIG. 2B. In this embodiment, the optional polarization rotation element 222 and the optional clean-up polarizer 226 may also be disposed directly on the PCP element 224, creating a single rigid or semi-rigid component comprising layers 228, 230, 232 and optional layers 222, 226, while leaving the LCD panel 220 physically distinct, as illustrated in FIG. 2C. This rigid or semi-rigid component may be spaced apart from the LCD panel 220, creating the air gap 234 between the LCD panel 220 and the optional polarization rotation element 222 or between the LCD panel 220 and the retarder film 232. Further, as illustrated in FIG. 2D, the PCP element 224 may be larger in height and/or width than the LCD panel.

To create an air gap 234 between the one or more rigid or semi-rigid layers, uniform spacers may optionally be used so that the PCP element 224 may be in close proximity to the LCD panel 220 but not touching the LCD panel 220. The size of the air gap 234 may be configured so as to avoid visible interference between the LCD panel 220 and the PCP element 224. The uniform spacers may comprise uniform balls, lithographically defined spacers, polymer spacers, or the like. When the air gap 234 is created, less bonding material may be required to bond the PCP element 224 with the LCD panel 220 because bonding material may only be required around the edges of the rigid or semi-rigid layers. The bonding material may be a pressure sensitive adhesive (PSA) such as the double-sided adhesive. Because the PSA bonding material may be very expensive, it may be beneficial to only bond around the edges of the rigid or semi-rigid layers in accordance with the disclosed principles. An optional anti-reflection coating may be applied to one or both surfaces adjacent to the air gap to improve efficiency.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A display for providing stereoscopic imagery, the display comprising:
   a stereoscopic display panel operable to provide left-eye and right-eye image encoded light;
   a polarization control panel (PCP) element positioned to receive light from the stereoscopic display panel and having an active switchable retarder operable to selectively transform the state of polarization (SOP) of light received from the stereoscopic display panel in synchronization with the left-eye and right-eye image encoded light; and
   wherein the stereoscopic display panel is bonded to the PCP element with an air gap therebetween, the air gap substantially coextensive along both length and width of the stereoscopic display panel, further wherein the PCP element is larger in length and width than the stereoscopic display panel such that the entirety of the stereoscopic display panel is covered by the PCP element.

2. A display in accordance with claim 1, wherein the stereoscopic display panel is a liquid crystal (LC) display panel.

3. A display in accordance with claim 1, wherein the stereoscopic display panel is an organic LED display panel.

4. A display in accordance with claim 1, wherein the active switchable retarder is a liquid crystal switchable retarder.

5. A display in accordance with claim 1, wherein the active switchable retarder comprises a pi-cell (parallel aligned) retarder or a fast electronically controlled birefringence (ECB) (anti-parallel aligned) retarder.

6. A display in accordance with claim 1, wherein the active switchable retarder is oriented at a first angle from vertical, the PCP element further comprising a retardation element orientated at a second angle from vertical, and one or more polarization retarder films.

7. A display in accordance with claim 6, wherein an order of the active switchable retarder, the retardation element and one or more retarder films is selected based on passive eyewear for use in viewing the left-eye and right-eye images.

8. A display in accordance with claim 1, further comprising a polarization rotation element positioned between the stereoscopic display panel and the PCP element operable to rotate the polarization axis of light received from the stereoscopic display panel to a substantially vertical orientation.

9. A display in accordance with claim 8, further comprising a clean-up polarizer positioned proximate to the polarization rotation element and operable to filter out unwanted light having a polarization axis that is not parallel to the vertical and thus transmit light only along the vertical orientation.

10. A display in accordance with claim 8, wherein the PCP element comprises the polarization rotation element and the clean-up polarizer.

11. A display in accordance with claim 1, further comprising substantially uniform spacers positioned along the perimeter of the stereoscopic display panel, the stereoscopic display panel bonded to the PCP element using said substantially uniform spacers.

12. A display for providing stereoscopic imagery, the display comprising:
   a stereoscopic display panel operable to provide left-eye and right-eye image encoded light;
   a polarization control panel (PCP) element positioned to receive light from the stereoscopic display panel, the PCP element being larger in length and width than the stereoscopic display panel such that the entirety of the stereoscopic display panel is covered by the PCP element, the PCP element having an active switchable retarder operable to selectively transform the state of polarization (SOP) of light received from the stereoscopic display panel in synchronization with the left-eye and right-eye image encoded light; and
   substantially uniform spacers positioned along the perimeter of the stereoscopic display panel, wherein the stereoscopic display panel is bonded to the PCP element using said substantially uniform spacers to provide an air gap therebetween, the air gap substantially coextensive along both length and width of the stereoscopic display panel.

13. A display in accordance with claim 12, wherein the stereoscopic display panel is a liquid crystal (LC) display panel.

14. A display in accordance with claim 12, wherein the stereoscopic display panel is an organic LED display panel.

15. A display in accordance with claim 12, wherein the active switchable retarder is a liquid crystal switchable retarder.

16. A display in accordance with claim 12, wherein the switchable retarder comprises a pi-cell (parallel aligned) retarder or a fast electronically controlled birefringence (ECB) (anti-parallel aligned) retarder.

17. A display in accordance with claim 12, wherein the active switchable retarder is oriented at a first angle from vertical, the PCP element further comprising a retardation element orientated at a second angle from vertical, and one or more polarization retarder films.

18. A display in accordance with claim 17, wherein an order of the active switchable retarder, the retardation element and one or more retarder films is selected based on passive eyewear for use in viewing the left-eye and right-eye images.

19. A display in accordance with claim 12, further comprising a polarization rotation element positioned between the stereoscopic display panel and the PCP element operable to rotate the polarization axis of light received from the stereoscopic display panel to a substantially vertical orientation.

20. A display in accordance with claim 19, further comprising a clean-up polarizer positioned proximate to the polarization rotation element and operable to filter out unwanted light having a polarization axis that is not parallel to the vertical and thus transmit light only along the vertical orientation.

21. A display in accordance with claim 20, wherein the PCP element comprises the polarization rotation element and the clean-up polarizer.

22. A display for providing stereoscopic imagery, the display comprising:
   an organic LED display panel operable to provide left-eye and right-eye image encoded light;
   a polarization control panel (PCP) element positioned to receive light from the organic LED display panel, the PCP element being larger in length and width than the LC display panel such that the entirety of the organic LED display panel is covered by the PCP element, the PCP element having an active LC switchable retarder operable to selectively transform the state of polarization (SOP) of light received from the organic LED display panel in synchronization with the left-eye and right-eye image encoded light; and
   wherein the organic LED display panel is bonded to the PCP element with an air gap therebetween, the air gap substantially coextensive along both length and width of the organic LED display panel.

23. A display in accordance with claim 22, wherein the active LC switchable retarder comprises a pi-cell (parallel aligned) retarder or a fast electronically controlled birefringence (ECB) (anti-parallel aligned) retarder.

24. A display in accordance with claim 22, wherein the active LC switchable retarder is oriented at a first angle from vertical, the PCP element further comprising a retardation element orientated at a second angle from vertical, and one or more polarization retarder films.

25. A display in accordance with claim 24, wherein an order of the active switchable retarder, the retardation element and one or more retarder films is selected based on passive eyewear for use in viewing the left-eye and right-eye images.

26. A display in accordance with claim 22, further comprising:
   a polarization rotation element positioned between the stereoscopic display panel and the PCP element operable to rotate the polarization axis of light received from the stereoscopic display panel to a substantially vertical orientation; and
   a clean-up polarizer positioned proximate to the polarization rotation element and operable to filter out unwanted light having a polarization axis that is not parallel to the vertical and thus transmit light only along the vertical orientation.

27. A display in accordance with claim 26, wherein the PCP element comprises the polarization rotation element and the clean-up polarizer.

28. A display in accordance with claim 22, further comprising substantially uniform spacers positioned along the perimeter of the organic LED display panel, the organic LED display panel bonded to the PCP element using said substantially uniform spacers.

* * * * *